United States Patent [19]

vom Hofe et al.

[11] 4,430,068
[45] Feb. 7, 1984

[54] PROCESS FOR THE MANUFACTURE OF A PACKAGING CONTAINER AND ASSEMBLY ITEMS

[75] Inventors: Dieter vom Hofe, Cologne; Klaus Meyer, Kaarst, both of Fed. Rep. of Germany

[73] Assignee: Henkel Kommanditgesellschaft auf Aktien, Düsseldorf-Holthausen, Fed. Rep. of Germany

[21] Appl. No.: 326,169

[22] Filed: Nov. 30, 1981

[30] Foreign Application Priority Data

Dec. 4, 1980 [DE] Fed. Rep. of Germany ....... 3045710

[51] Int. Cl.³ .............................................. B31B 7/00
[52] U.S. Cl. .................................. 493/100; 264/516; 493/87; 493/101; 493/907
[58] Field of Search .................. 493/100, 101, 93, 87, 493/907; 264/516; 53/175

[56] References Cited

U.S. PATENT DOCUMENTS

| | | | |
|---|---|---|---|
| 1,991,223 | 2/1935 | Ledig et al. | 493/93 X |
| 3,169,086 | 2/1965 | Meissner | 264/516 X |
| 3,219,240 | 11/1965 | Campbell, Jr. | 493/87 X |
| 3,423,818 | 1/1969 | Ruekberg | 493/100 X |
| 3,468,224 | 9/1969 | Rausing et al. | 493/100 |
| 3,672,122 | 6/1972 | Berger et al. | 493/100 X |
| 4,342,183 | 8/1982 | Gordon et al. | 264/516 X |
| 4,379,455 | 4/1983 | Deaton | 220/404 X |

FOREIGN PATENT DOCUMENTS 2915228 4/1979 Fed. Rep. of Germany.

Primary Examiner—James F. Coan
Attorney, Agent, or Firm—Hammond & Littell, Weissenberger and Muserlian

[57] ABSTRACT

The packaging container consists of a mechanically stabilizing case of paper, cardboard and/or metal with inserted sealing liner, which sealing liner is in the form of a plastic bubble with a neck part shaped from it and extending above the case. Both elements are manufactured separately and coupled together with the aid of an adapter cover. This is lockingly connected with the neck of the sealing liner and adapted to an opening in the case, into which it can lock. It is slipped over the sealing liner preform before the stretching and inflating of the liner and is secured against shifting by means of fixing cams.

6 Claims, 11 Drawing Figures

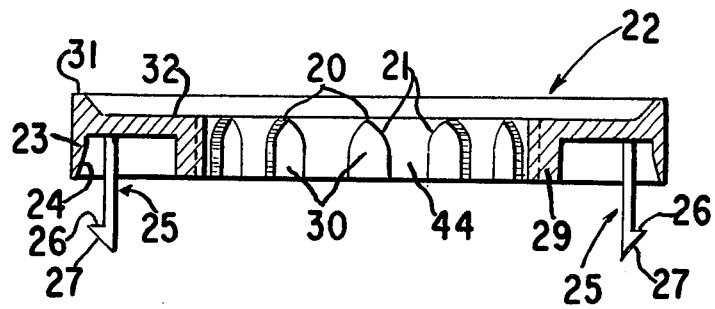
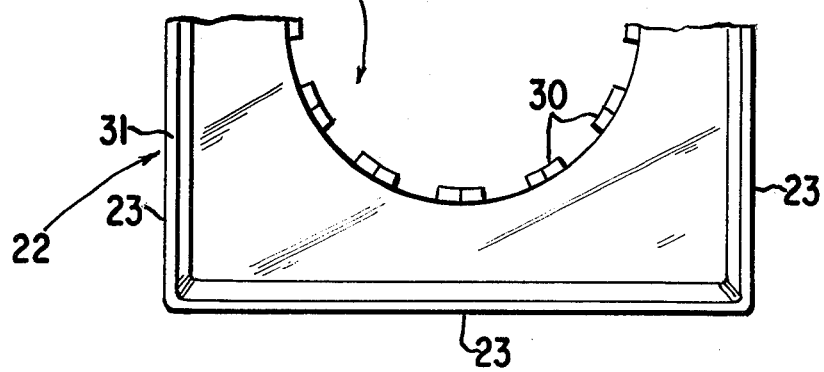
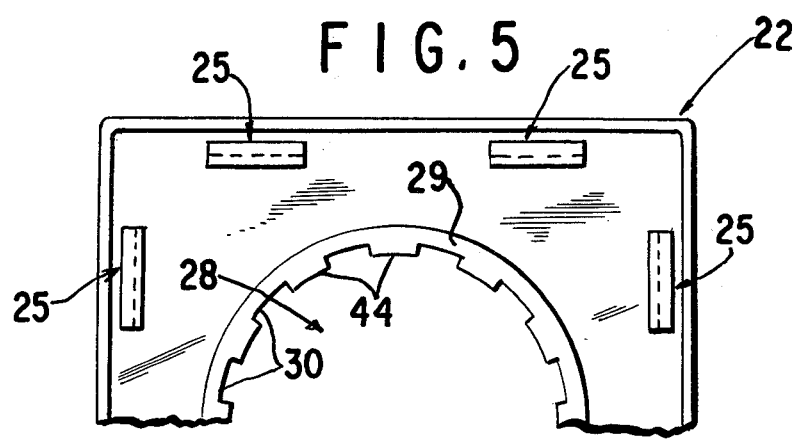

PROCESS FOR THE MANUFACTURE OF A PACKAGING CONTAINER AND ASSEMBLY ITEMS

BACKGROUND OF THE INVENTION

The invention concerns a process for the preparation of a packaging container with mechanically stabilizing case of paper, cardboard, metal or a combination thereof, and a sealing liner inserted into it, which sealing liner is in the form of a plastic bubble with a shaped neck part shaped from it and extending above the case. In the process the sealing liner is blown, starting with a preform, the case is prepared in a separate process, and the sealing liner is inserted into the case. The invention further concerns sealing liners, adapter covers and cases for carrying out the process.

A packaging container is described in German Published Application DE-OS No. 29 15 228, which consists essentially of a thin-walled inner bubble with shaped opening or neck part containing the respective product, liquid or flowing, and an outer covering or case surrounding the bubble or liner and stabilizing its shape. The case may also be made of a folding carton, for example. The packaging container is to be formed or prepared by quantitative and qualitative adjustment of the packaging materials utilized so that an economically especially favorable final product is obtained for respective volume ranges, which can, as required, protect food, be resistant to chemicals, highly gas tight, require little space for storage when empty, be manufactured from the least amount of raw materials, easy to fold after use, exceptionally good to decorate and/or to close in any desired manner. The assembling of case and liner for the completion of the package, however, poses problems.

OBJECTS OF THE INVENTION

An object of the present invention is the development of a process for the manufacture of a packaging container consisting of a mechanically stabilizing case of paper, cardboard, metal, plastic or a combination thereof and a sealing liner inserted therein in the form of a hollow, thin-walled plastic extension with a neck part integrally attached to said plastic extension and adapted to extend above said case, comprising the steps of inserting said plastic extension with a neck part integrally attached thereto into an adapter cover adapted to cover an opening in said stabilizing case and having first means to cooperate with means in said neck part to both frictionally seal with said neck part and prevent movement in a circumferential direction around said neck part, and second means adapted to fasten said adapter cover to said stabilizing case, assembling a precut blank into a case adapted to enclose said plastic extension, said case having an opening therein and means to receive and permanently clasp said adapter cover second means, inserting said plastic extension with said adapter cover into said case whereby said means to receive and permanently clasp, receives and permanently clasps said second means, and recovering an integral packaging container consisting of a stabilizing case with cover having a plastic extension therein with an integrally attached neck extending above the cover.

These and other objects of the invention will become more apparent as the description thereof proceeds.

THE DRAWINGS

FIG. 3 shows an adapter cover partially in cross section.

FIG. 4 shows the adapter cover of FIG. 3 from above.

FIG. 5 shows the adapter cover of FIG. 3 from below.

DESCRIPTION OF THE INVENTION

Figure 1:
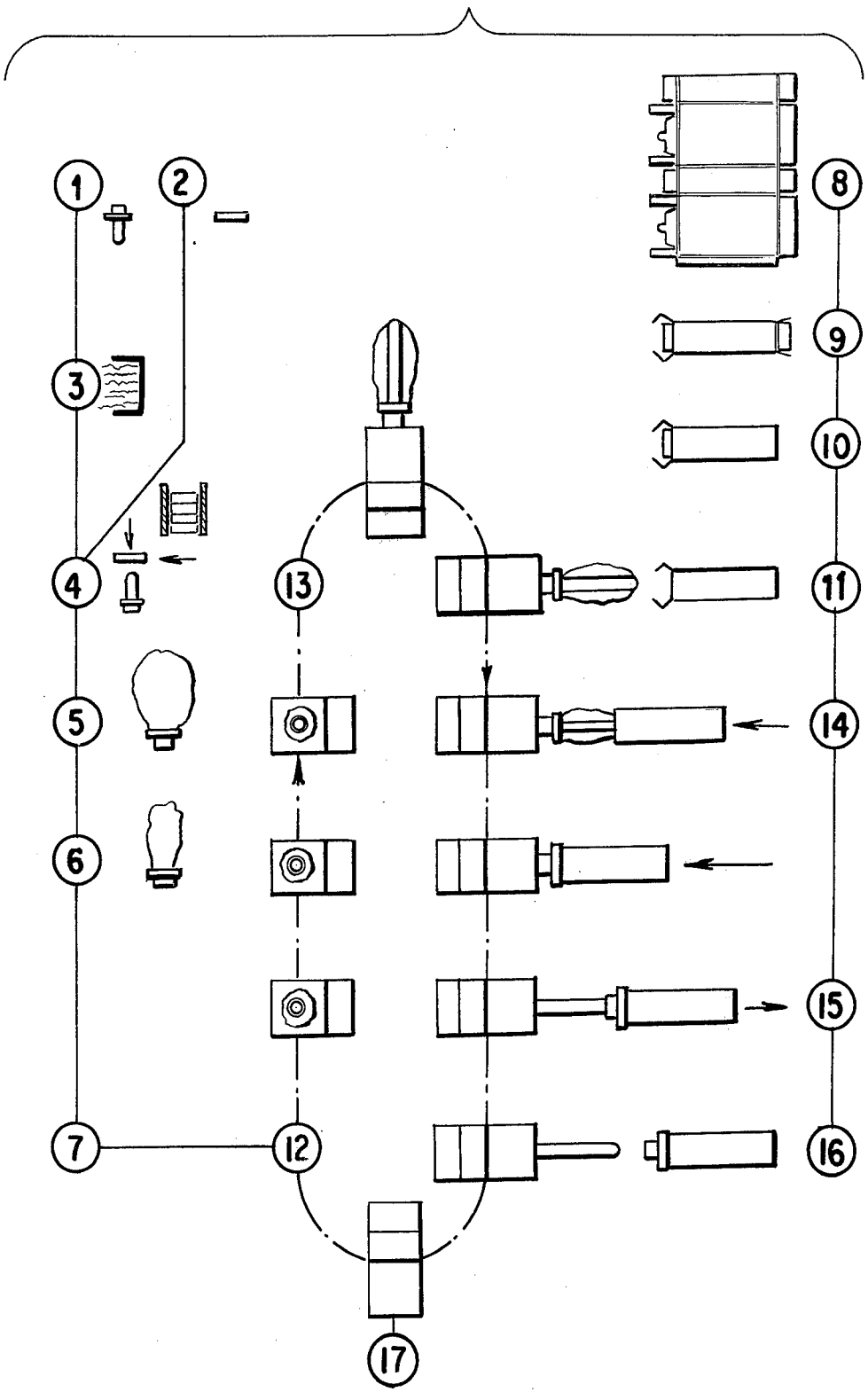
FIG. 1 depicts a manufacturing and assembly flow diagram for the production of the package container of the invention.

The invention is based on the conceiving of a process for the manufacture of the packaging container with a mechanically stabilizing case and separately produced, sealing liner by which the individual parts of the packaging can be manufactured on known equipment, and the assembling of these individual parts can be integrated into the production process at low cost. The solution according to the invention consists of the coupling of the case and the liner with the aid of an adapter cover connected to the liner and adapted to seal the lining to be inserted into an opening of the case.

More particularly, the present invention relates to a process for the manufacture of a packaging container consisting of a mechanically stabilizing case of paper, cardboard, metal, plastic or a combination thereof and a sealing liner inserted therein in the form of a hollow, thin-walled plastic extension with a neck part integrally attached to said plastic extension and adapted to extend above said case, comprising the steps of inserting said plastic extension with a neck part integrally attached thereto into an adapter cover adapted to cover an opening in said stabilizing case and having first means to cooperate with means in said neck part to both frictionally seal with said neck part and prevent movement in a circumferential direction around said neck part, and second means adapted to fasten said adapter cover to said stabilizing case, assembling a precut blank into a case adapted to enclose said plastic extension, said case having an opening therein and means to receive and permanently clasp said adapter cover second means, inserting said plastic extension with said adapter cover into said case whereby said means to receive and permanently clasp, receives and permanently clasps said second means, and recovering an integral packaging container consisting of a stabilizing case with cover having a plastic extension therein with an integrally attached neck extending above the cover.

The adapter cover used according to the invention is a "cover" in the general sense of the word, that is, the adapter cover can represent any closure in the top, in the wall or in the bottom of the case. According to the invention, the adapter cover for the connecting of the plastic bubble or liner to the case, is slipped over the preform and fixed thereto in a position secure against twisting in the circumferential direction. Then the preform with attached adapter cover is reshaped, particularly by warming and inflation. The reshaping of the preform in the stretching and inflating process also secures the adapter cover in the axial direction of the bubble or liner produced from the preform, before and after the insertion of the assembly into the case. This method results in a tight connection between adapter cover and liner that cannot be undone. The adapter cover should be formed advantageously so that a secure connection is formed with the case, which can be broken only by the destruction of the package, by simple insertion in the opening of the case, for example, of a preglued folding carton, which is correspondingly shaped at its opening.

For a relatively simple assembling of lines and adapter cover on the one hand, and outer case on the other, it is of special importance within the scope of the process according to the invention that the adapter cover, which is essential for the assembling, is already attached to the liner before the stretching and inflating of the preform, by preassembling as one building element consisting of preform and adapter cover, which is to be formed into the liner already on the stretching and inflating machine. This method eliminates an otherwise difficult to manage manipulation with the finished liner that is unstable with respect to shape, on the one hand, and the adapter cover or a similar building element, on the other hand.

The invention also concerns an assembly for the execution of the process which is characterized by fixing cams formed on the neck of the preform with a view toward automatic engaging with fixing cams on the adapter cover, for the fastening of the adapter cover relative to the preform in the circumferential direction. Further, the invention concerns means of attachment at the adapter cover for fastening on the case as well as fixing cams shaped at the edge of an opening in the cover for an engaging of fixing cam sockets on the liner or the preform, for the fastening of the cover in the circumferential direction. Finally, the invention concerns a case with means for the engaging of the adapter cover at the edge of the circumference of an opening in the case intended for the insertion of the liner and to be closed with the cover.

Additional details of the invention are explained with the drawings.

Figure 2:
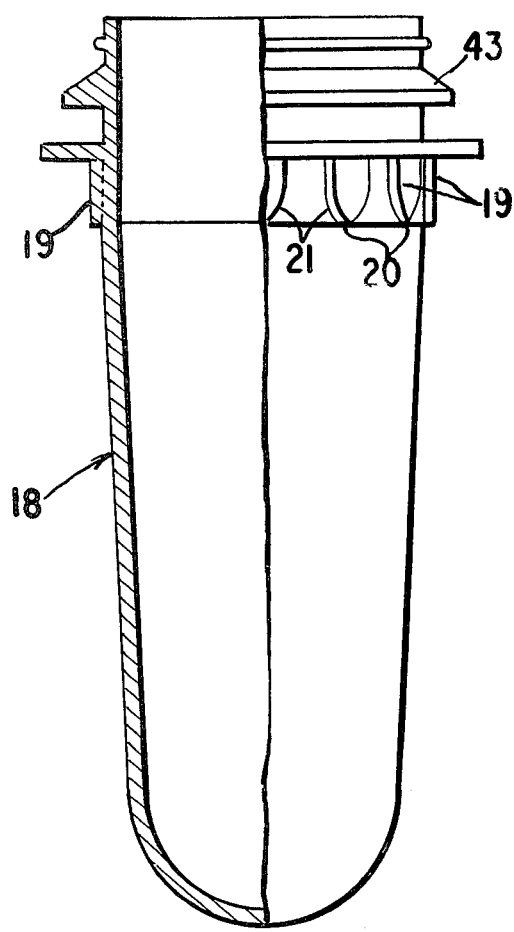
FIG. 2 shows a non-expanded plastic preform with a neck part integrally attached thereto, partly cut away.
Figure 6:
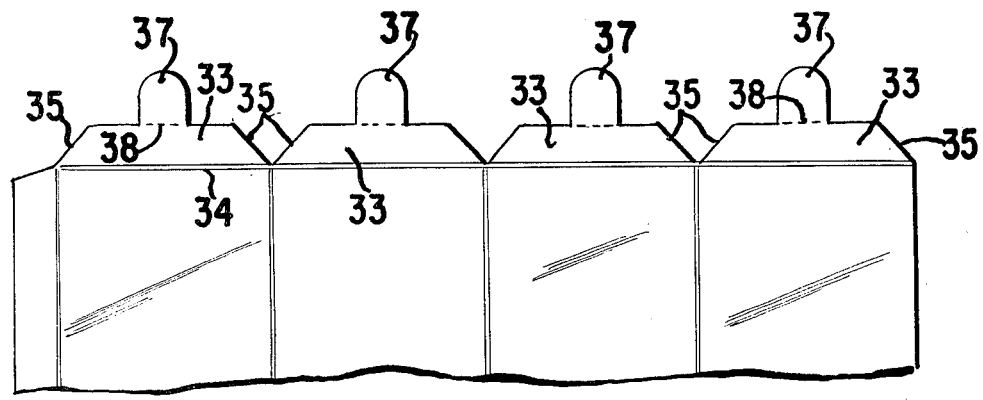
FIG. 6 shows the top of one embodiment of a stabilizing case precut blank.
Figure 7:
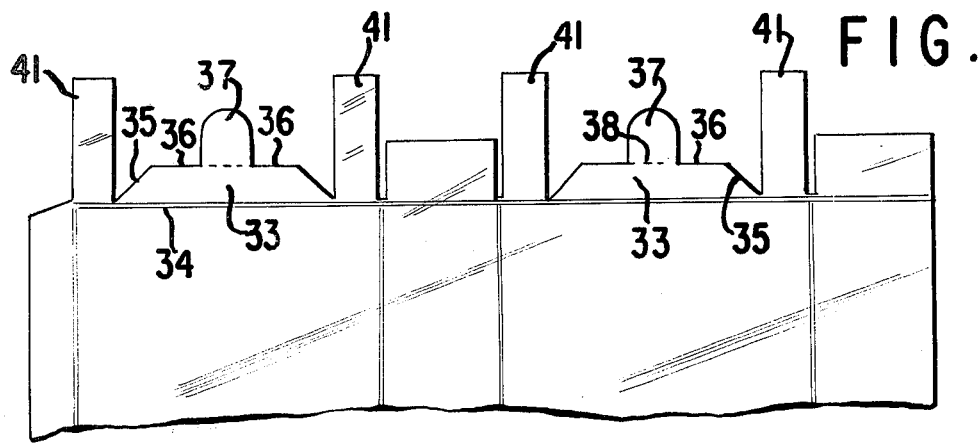
FIG. 7 shows the top of a second embodiment of a stabilizing case precut blank.
Figure 8:
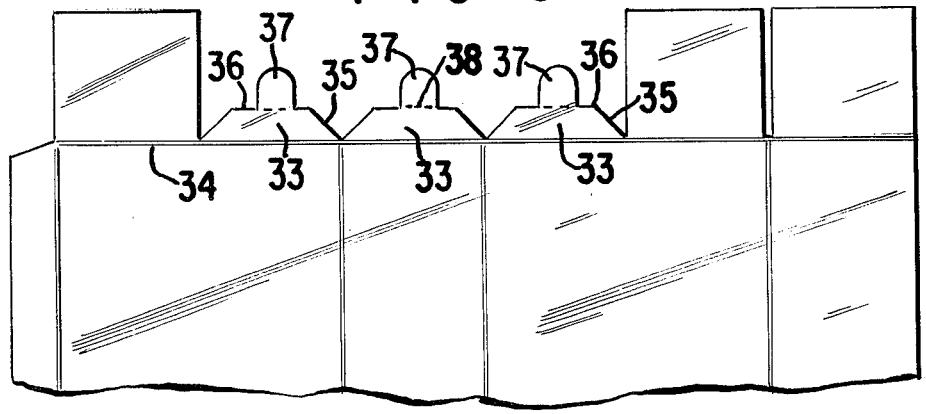
FIG. 8 shows the top of a third embodiment of a stabilizing case precut blank.

FIG. 1: a manufacturing and assembly scheme;
FIG. 2: a preform partly cut away;
FIG. 3: an adapter cover, cutaway drawing;
FIG. 4: the adapter cover of FIG. 3 from above;
FIG. 5: the adapter cover of FIG. 3 from below;
FIGS. 6 to 8: different types of folding cartons; and
FIGS. 9 to 11: process steps in the assembly of the formed liner/adapter cover with a folding carton.

The invention is described in part with the example of folding cartons in the following text. However, the meaning can be applied without difficulty to the use of other cases, for example, a wrapped tube with flanged edge, a metal container with respective top-cover shape, a drum-like container and receptacles of similar type.

In the example of the manufacturing and assembly scheme of FIG. 1, according to the invention, the preform is produced at station 1 and the adapter at station 2. At station 3, the preform is warmed. At station 4, the adapter cover from station 2 is advanced and slipped over the warmed preform from station 3. At station 5, the preform is reshaped into the bubble liner. At station 6, the completed bubble is deflated and at station 7, the deflated bubble or liner, which is preassembled with the adapter cover, is advanced into the final assembly line for further work.

In a parallel running production line, the folding carton is stamped out at station 8. At station 9, the folding carton is turned into a carton tube. At station 10, the folding carton bottom is glued and at station 11, the folding carton is advanced for further work in the final assembly line. In the latter, the liner with adapter cover is introduced at station 12, where it is placed on a spindle that corresponds in length approximately to the stretched length of the liner. The spindle with liner then swings around at station 13 into a feeding direction. The folding carton is then slipped, centered over liner and spindle at station 14, until the adapter cover engages with the folding carton. Finally, the assembled package is removed from the spindle at station 15, the package can be advanced at station 16 into the filling equipment and the pickup spindle swings back at station 17 to return into the feeding station 12.

Due to the fact that, according to the invention, an adapter cover adapted to an opening in the case is fixed to the preform for the fashioning of the liner before inflating, the production of the package, including the assembling and insertion of liner and case, can be integrated into an automatic assembling process.

A preform suitable for the execution of the process according to the invention is shown in FIG. 2 partly cut away, and designated as 18 in its entirety. Fixing cams 19 ending in points 20, given as example, are provided at the neck 43 of the preform 18. These cams 19 serve for the radial fixing or for the fixing of the adapter cover 22 (see FIGS. 3 to 5) against movement in the circumferential direction. The points 20, together with the radii 21 joining them, provide for an automatic engaging of the fixing cam socket 30 around the opening 28 of the adapter cover 22.

Such an adapter cover 22 is shown as cutaway drawing, given as an example, in FIG. 3. FIG. 4 shows the same adapter cover viewed from above, and in FIG. 5, viewed from below. This adapter cover 22 has a lateral edge 23 that is extending downward, which, depending on the placing of the folding carton or in dependence on the shaping of the folding carton (see FIGS. 6 to 8), is to be arranged either enclosing, three-sided or extending on two opposing sides. An insertion slope 24 is provided on the inside of lateral edge 23. Each side of the lateral edge 23 is provided with at least one holding cam 25, which has a recessed cut 26 as well as a slanted guiding point 27.

According to the invention, a circular cut-out 28, which can also have a different shape, such as polygonal, oval, and is enclosed by a band 29, is provided in the adapter cover 22. At the inner periphery of band 29, or at the outer periphery of cut-out 28, there are fixing cam sockets 30 adapted to receive the fixing cams 19 formed by extensions 44 which extend downwardly as shown in FIG. 3. The fixing cam sockets 30 extend through radii 21 into points 20, corresponding to the fixing cams 19 of the preform 18. The points of the preform 18 are pointing exactly in the direction opposite to those in the adapter cover 22.

On the upper side of the adapter cover 22 is an enclosing edge 31, which forms a sort of catch basin 32 for drops in the finished state. This prevents, after use and reclosing of the package with a measuring cap threaded to fit on neck 43 by the consumer, the spilling of a remainder of the product out of the measuring cap and over the enclosing edge 31 onto the case.

FIG. 6 shows an example of the upper part of a stamped out folding carton for the production of a square folding carton, while in FIG. 7, the same is shown for a rectangular folding carton with centrally located filling opening, and in FIG. 8, for a rectangular folding carton with the filling opening located at the side. The alternate stamped out folding cartons shown in FIGS. 6 to 8 have, depending on the desired location of the adapter cover 22 and thus of the filling opening of the liner or bubble on the folding carton or in dependence on the shape of the folding carton at least two profile tabs 33 at the top side. Each profile tab 33 extends conically, starting from a slightly creased folding line 34, on either side, with narrowing edges 35, to form tab end 36.

Preferred is the presence of an approximately semicircular extension or tongue 37 in the center of tab end 36, which has a slit 38 in the direction of the line of the tab end 36 from the outside of the carton, so that tongues 37 are easy to tilt inward, or tilt inward by themselves, when the carton is assembled in the folded tube form. With this or a similar arrangement and a corresponding construction, tongues 37 are particularly advantageous for the simple performance of the process for the assembling of liner, adapter cover and case or folding carton according to the invention.

Instead of the models shown in FIGS. 6 to 8, other folding cartons can be used that allow the engaging of an adapter cover, such as by gluing a cardboard strip into the upper area of the stamped out folding carton, behind the lower end of which the holding cams engage, or by arranging cut-outs in the stamped out carton or in the cardboard strip, into which the holding cams can lock.

Figure 9:
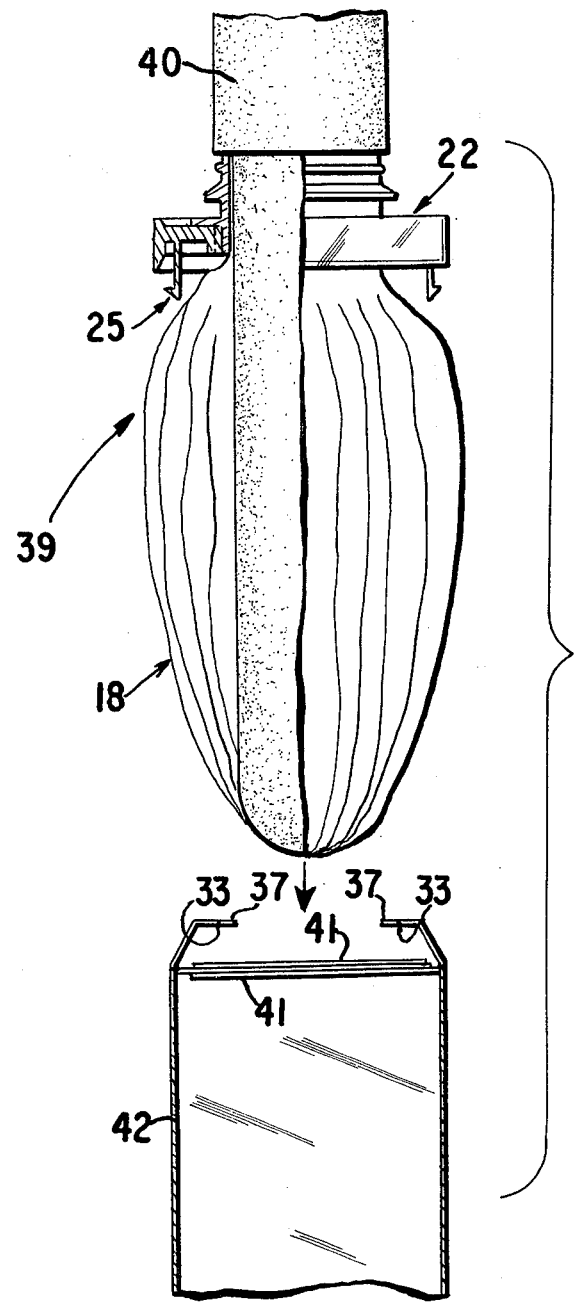
FIG. 9 shows the liner with adapter cover with insertion mandrel therein about to be inserted into a stabilizer case, both partly cut away.
Figure 10:
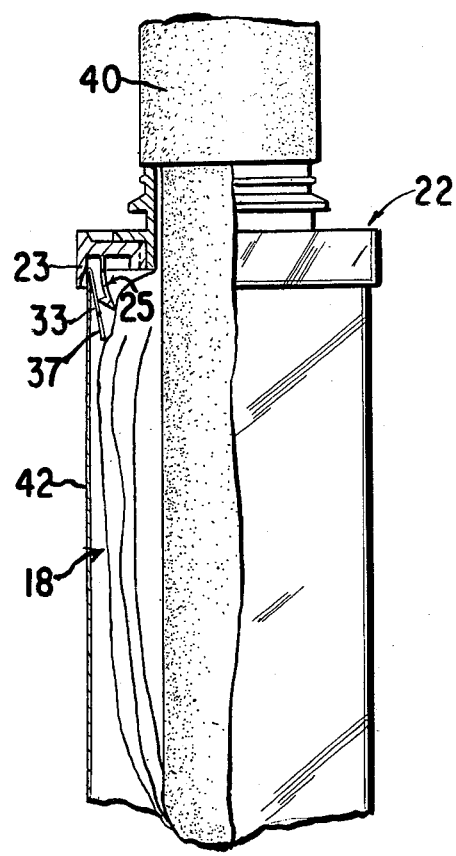
FIG. 10 shows the liner with adapter cover inserted into a stabilizer case, said insertion mandrel inserted therein to its fullest extent, partially cut away.
Figure 11:
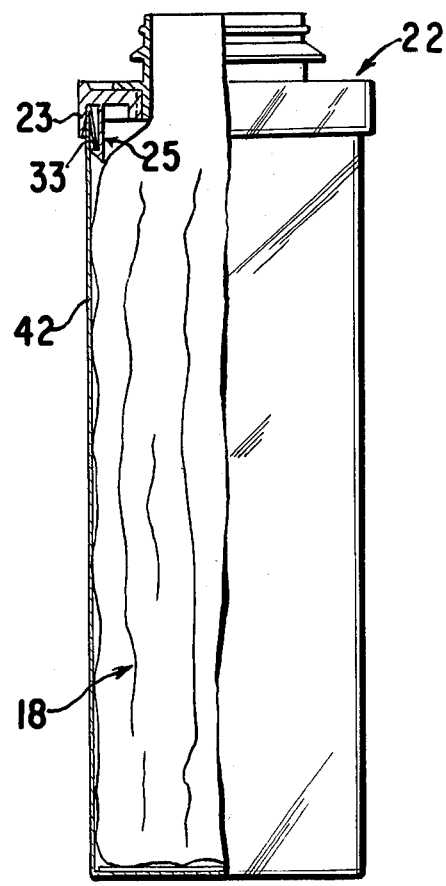
FIG. 11 shows the completed packaging container assembly, partly cut away.

The assembling of the combination of liner/adapter cover with the folding carton according to FIG. 7 is shown schematically in the position shortly before the insertion of the liner into the carton in a partial cutaway drawing in FIG. 9. FIG. 10 shows the assembling after the insertion of the liner, shortly before the snapping in of the adapter cover in a partial cutaway drawing. Finally, FIG. 11 shows the completed package assembled by the process according to the invention in a partial cutaway drawing.

In FIG. 9, the preassembled adapter cover and liner are located, as unit 39, on the pickup spindle 40, and the folding carton with top-side tabs 41 glued according to FIG. 7, is positioned with its filling opening exactly over the center of the pickup spindle. The profile tabs 33 are slightly sloped inward with tongues 37 at an angle. In the condition according to FIG. 10, the inserted liner unit 39 has pressed the profile tabs 33 into the inside of the carton. The holding cams 25 now dipping into the folding carton give slightly toward the inside and allow the folding carton wall 42 with the profile tabs 33 bent over inward to slip between lateral edge 23 and the holding cams 25. Finally, FIG. 11 shows the condition of the package after the completion of the process according to the invention. The folding carton wall 42 is squeezed between lateral edge 23 and the holding cams 25 with its folded-over profile tabs 33. The holding cams 25 have returned to their original position, because the recessed cut was able to lock behind the profile tab end 36.

List of Reference Numbers 1. preform production line
2. adapter production line
3. preform-warming station
4. adapter cover - feeding station
5. preform - reshaping station
6. deflating the bubble station
7. final station, stretching and inflating machine
8. stamping out of the folding carton station
9. folding carton tubing forming station
10. gluing of folding carton bottom and top tabs station
11. final station, folding carton manufacture
12. feeding station, final assembly
13. swinging around of spindle
14. advance of folding carton
15. removal of folding carton
16. final station, assembly
17. raising spindle station
18. preform
19. fixing cams
20. points '21. radii
22. adapter cover
23. lateral edge
24. insertion slope
25. holding cams
26. recessed cut-out
27. sloped point for insertion
28. cut-out
29. band
30. fixing cams socket
31. top edge
32. catch basin for drops
33. profile tabs
34. folding line
35. side edges
36. tab ends
37. tongue
38. crease
39. unit
40. pickup spindle
41. top tabs
42. folding carton wall
43. neck
44. extension forming fixing cam socket The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the manufacture of a packaging container consisting of a mechanically stabilizing case of paper, cardboard, metal, plastic or a combination thereof and a sealing liner inserted therein in the form of a hollow, thin-walled plastic extension with a neck part integrally attached to said plastic extension and adapted to extend above said case, comprising the steps of inserting said plastic extension with a neck part integrally attached thereto into an adapter cover adapted to cover an opening in said stabilizing case and having first means to cooperate with means in said neck part to frictionally seal and to prevent movement in a circumferential direction around said neck part while forming a liquid tight seal, and second means adapted to fasten said adapter cover to said stabilizing case, assembling a precut blank into a case adapted to enclose said plastic extension, said case having an opening therein and means to receive and permanently clasp said adapter cover second means, inserting said plastic extension with said adapter cover into said case whereby said means to receive and permanently clasp, receives and permanently clasps said second means, and obtaining an integral packaging container consisting of a stabilizing case with cover having a plastic extension therein with an integrally attached neck extending above the cover.

2. The process of claim 1 wherein said plastic extension with a neck part integrally attached thereto is in an unexpanded form during the step of inserting into said adapter cover and is subsequently expanded to form a plastic bubble, the expansion acting to secure said adapter cover against shifting in an axial direction with respect to the expanded plastic bubble having a neck part integrally attached thereto.

3. The process of claim 1 or 2 wherein said inserting of said plastic extension with said adapter cover into said case is performed by placing said plastic extension with said adapter cover on a spindle having a length of about that of the depth of said case and inserting said spindle into said case.

4. The process of claim 1 or 2 conducted mechanically.

5. The process of claim 1 wherein said plastic extension with a neck part has fixing cams extending from the neck part and said first means to cooperate with means in said neck part are a series of fixing cam sockets adapted to receive fixing cams on the neck of said plastic extension with a neck part.

6. The process of claim 2 wherein said plastic extension with a neck part has fixing cams extending from the neck part and said first means to cooperate with means in said neck part are a series of fixing cam sockets adapted to receive fixing cams on the neck of said plastic extension with a neck part.

* * * * *